United States Patent
Stillwell et al.

(10) Patent No.: US 8,663,515 B2
(45) Date of Patent: Mar. 4, 2014

(54) PROCESS FOR MOULDING PLASTIC ARTICLES

(75) Inventors: Nicholas Stillwell, Trowbridge (GB); Alfred Rodlsberger, Piesendorf (AT)

(73) Assignee: Upcycle Holdings Limited (IE)

(*) Notice: Subject to any disclaimer, the term of this patent is extended or adjusted under 35 U.S.C. 154(b) by 477 days.

(21) Appl. No.: 12/995,657

(22) PCT Filed: Jun. 9, 2009

(86) PCT No.: PCT/GB2009/001424
§ 371 (c)(1),
(2), (4) Date: Dec. 1, 2010

(87) PCT Pub. No.: WO2010/001083
PCT Pub. Date: Jan. 7, 2010

(65) Prior Publication Data
US 2011/0081516 A1    Apr. 7, 2011

(30) Foreign Application Priority Data
Jun. 9, 2008  (GB) .................. 0810555.3

(51) Int. Cl.
*B29C 65/00*    (2006.01)

(52) U.S. Cl.
USPC .................... 264/46.6; 264/46.4

(58) Field of Classification Search
USPC ............ 264/46.4, 46.5, 46.6, 46.9, 310, 311, 264/312
See application file for complete search history.

(56) References Cited

U.S. PATENT DOCUMENTS

| | | | |
|---|---|---|---|
| 3,419,648 A | 12/1968 | Leach | |
| 3,505,137 A * | 4/1970 | Kliene | ............... 156/78 |
| 3,680,629 A | 8/1972 | Gaudreau et al. | |
| 3,754,852 A * | 8/1973 | Rempel | ............ 425/429 |
| 3,989,787 A * | 11/1976 | Scott et al. | ............ 264/114 |
| 5,454,703 A | 10/1995 | Bishop | |
| 2005/0040563 A1 | 2/2005 | Lang et al. | |
| 2006/0131773 A1 | 6/2006 | Linares et al. | |

FOREIGN PATENT DOCUMENTS

| | | |
|---|---|---|
| DE | 1271379 | 6/1968 |
| DE | 19809250 A1 | 9/1999 |
| DE | 102004006441 A1 | 12/2005 |
| EP | 0679488 A1 | 11/1995 |

(Continued)

OTHER PUBLICATIONS

PCT International Search Report for International Application No. PCT/GB2009/001424 date of mailing: Jul. 12, 2009 (13 pages).

(Continued)

*Primary Examiner* — Galen Hauth
(74) *Attorney, Agent, or Firm* — Luedeka Neely Group, PC

(57) ABSTRACT

A process for forming plastic articles is described which uses a machine (10) having a pair of hingedly-connected female molds (12, 14), which can be heated and cooled and which can be clamped together. The process involves placing a plastic particulate material in each mold (12, 14) when they are in an open position and heating the molds (12, 14) to form a plastic skin (58, 60) lining each mold (12, 14). An expandable filler material (62) is then placed in one mold and the two molds clamped closed to form a completely closed cavity. The plastic skins in the two molds bond together to form a continuous plastic shell (66) completely encasing the filler material (62).

12 Claims, 4 Drawing Sheets

(56) References Cited

FOREIGN PATENT DOCUMENTS

| | | |
|---|---|---|
| EP | 1459862 A1 | 9/2004 |
| GB | 733623 | 7/1955 |
| GB | 1025493 | 4/1966 |
| GB | 1217914 | 1/1971 |
| WO | 02-062550 A1 | 8/2002 |
| WO | 02062550 A1 | 8/2002 |
| WO | 2004-030888 A1 | 4/2004 |
| WO | 2005-090041 A2 | 9/2005 |
| WO | 2006-114632 A2 | 11/2006 |

OTHER PUBLICATIONS

Intellectual Property Office Patents Act 1977 Further Search Report under Section 17 for Application GB0810555.3 date of search: Apr. 24, 2009 (1 page).

Intellectual Property Office Patents Act 1977 Further Search Report under Section 17 for Application GB0810555.3 date of search: Oct. 9, 2008 (1 page).

PCT/GB2009/001424 International Preliminary Report, date of mailing Dec. 23, 2010 (8 pages).

* cited by examiner

PROCESS FOR MOULDING PLASTIC ARTICLES

CROSS-REFERENCE TO RELATED APPLICATION

This application claims priority under all applicable statutes, and is a U.S. National phase (37 USC Section 371) of International Application PCT/GB2009/001424, filed Jun. 9, 2009, and entitled PROCESS FOR MOULDING PLASTIC ARTICLES, which claims priority to GB 0810555.3, filed Jun. 9, 2008, incorporated herein by reference in their entireties The present invention relates to a process for forming plastic articles with a sandwich construction, in particular having a continuous plastic skin enclosing a foamed core, which may be made of recycled waste material. The process is particularly suited to the production of large-area plate members.

A number of different machines and processes for moulding plastic articles are well-known, such as injection moulding, blow moulding and so on. A more recent example is powder impression moulding, as discussed in WO 2002/062550. In this process, particulate plastic material is placed in contact with moulds which have typically been heated by convection in ovens. A plastic skin forms on the mould. Two complementary moulds may be brought together with a filler material placed between the plastic skins formed on each mould to create a sandwich construction resulting in a separate plastic skin on each side of the filler material. However, no machine to operate this process efficiently in practice has yet been developed. The existing attempts have a very high capital cost in providing equipment such as ovens to heat the moulds, and cranes and conveyors for moving the moulds and so on. Furthermore, the use of ovens and convection heating leads to very high energy consumption, uneven heating of the moulds and therefore an uneven surface finish to the products. Also, handling of separate moulds is awkward and leads to formation of unsatisfactory seams on the moulded product. The present invention addresses such problems and limitations of this prior art.

The present invention provides a process for moulding a plastic article using a machine comprising a pair of moulds each defining a mould cavity, the moulds movable between an open position in which the mould cavities are open and a closed position in which the moulds co-operate to define a completely closed mould cavity, and means to heat and cool the moulds; the method comprising the steps of placing the moulds in the open position, heating the moulds by conduction to a temperature above the melting point of a given plastic material, placing the plastic material in particulate form into the moulds, whereupon the plastic forms a skin lining each mould, placing expandable filler material in the plastic skin formed in one mould, closing the moulds to create a completely closed mould cavity, whereupon the plastic skins in the moulds bond to each other to form a continuous plastic shell which completely encases the filler material, cooling the moulds and opening the moulds to remove the moulded article.

The step of forming a plastic skin in one of the moulds may comprise placing a former in the mould cavity so as to leave a gap between the former and the side walls of the cavity, placing plastic material into the gap to form a plastic skin lining the side walls of the cavity, removing the former and placing further plastic material on the bottom of the mould cavity to form a plastic skin lining the bottom of the mould and integral with the plastic skin lining the side walls.

Prior to removal of the former, the process may include the step of inverting the mould in order to remove any excess material therefrom.

The step of heating by conduction preferably comprises pumping heated fluid through channels formed in the moulds.

Similarly, the step of cooling preferably comprises pumping cooling fluid through channels formed in the moulds.

The step of closing the moulds preferably includes clamping the moulds together.

In one example, the step of heating includes raising the temperature of the moulds to 220° C., and the step of cooling includes lowering the temperature of the moulds to 80° C.

Preferably the moulds are connected to each other by at least one hinge about which the moulds are pivotable to move between the open and closed positions.

The method preferably further comprises providing an insulating jacket around each mould.

The clamping step in one example comprises providing at least one bolt pivotally connected to one mould and locatable in a boss secured to the other mould.

Preferably, the method further comprises providing a reinforcement structure to resist buckling of the moulds and to act as a support for the moulds.

The present invention also provides a moulded plastic article comprising a continuous plastic skin completely encasing the filler material and produced by the process as described above.

Preferably, the article is a plate member, each side of which is greater than 1000 mm in length and which has a thickness of greater than 8 mm.

The present invention will now be described in detail, by way of example only, with reference to the accompanying drawings in which.

FIGS. 6a-f are schematic diagrams of parts of the moulds showing the moulding process according to the present invention.

Figure 1:
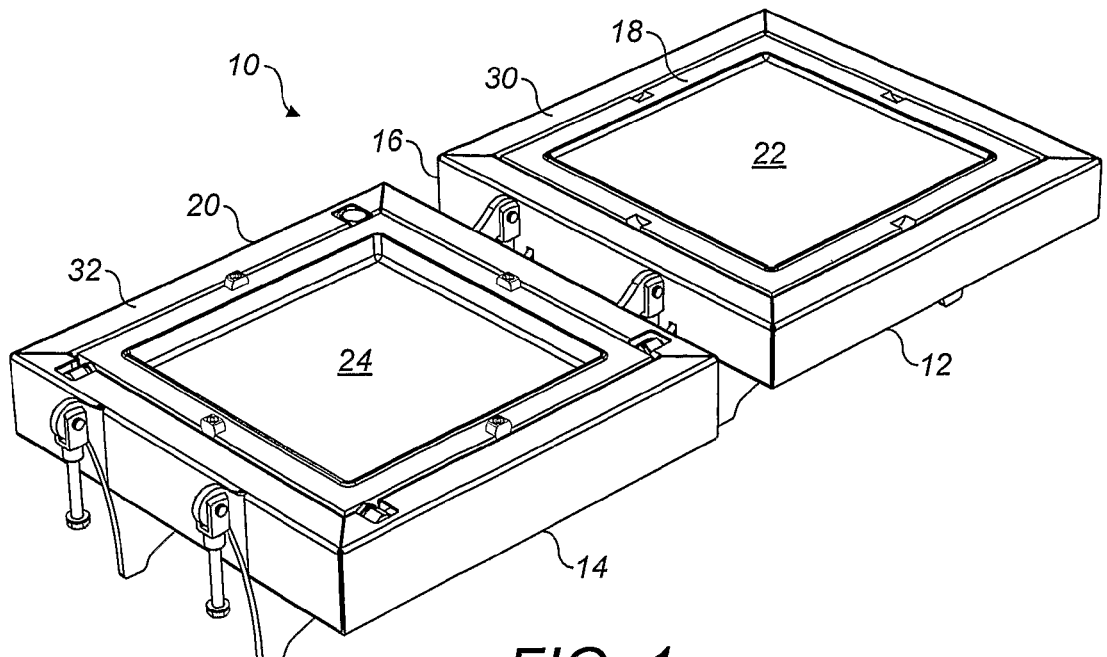
FIG. 1 is a perspective view in the open position of a plastic moulding machine for use in the method according to the present invention.
Figure 2:
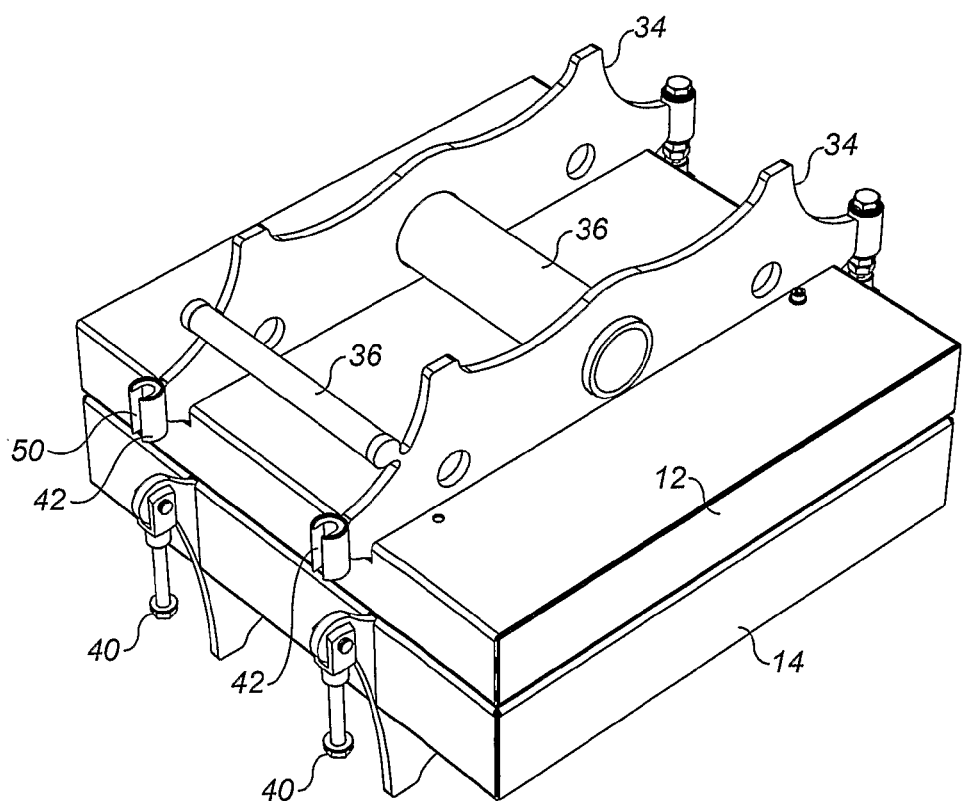
FIG. 2 is a perspective view of the machine of FIG. 1 in the closed position.
Figure 3:
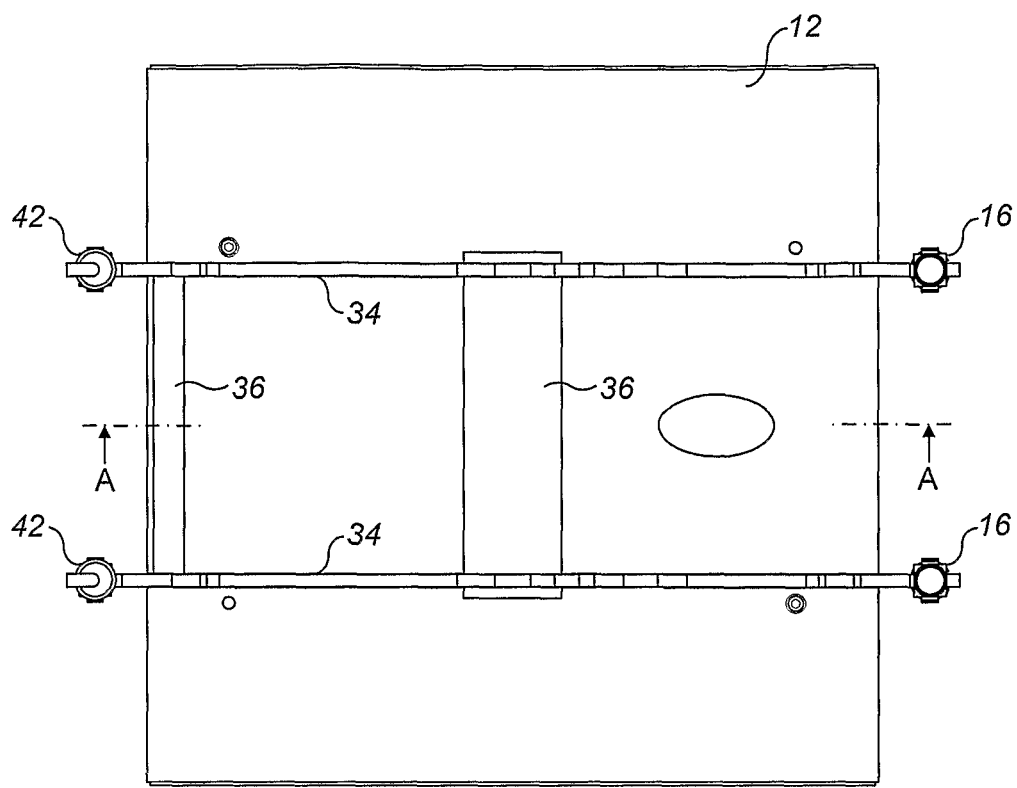
FIG. 3 is a plan view of the machine of FIGS. 1 and 2 in the closed position.

As shown in FIGS. 1 and 2, machine 10 suitable for use in the method according to one embodiment of the present invention comprises upper and lower mould halves 12, 14. The mould halves 12, 14 are joined by hinges 16 so that the mould halves can be moved between the open position seen in FIG. 1 and the closed position seen in FIG. 2.

Each mould half 12, 14 comprises a mould 18, 20 defining a mould cavity 22, 24 for forming a plastic article. In this example, the mould cavities 22, 24 are square, measuring 300 mm along each side, and with radiused corners. The upper mould cavity 22 is shallow, with a depth of 5 mm, while the lower mould cavity 24 is deeper with a depth of 25 mm. Thus, in the closed position, moulds 18, 20 co-operate to define an entirely closed mould cavity 30 mm deep and with no vents. However, such dimensions are by no means limiting Indeed, the present invention is particularly suitable for producing large-area plate members with dimensions of more than 1000 mm along each side and with a thickness of more than 8 mm.

Figure 5:
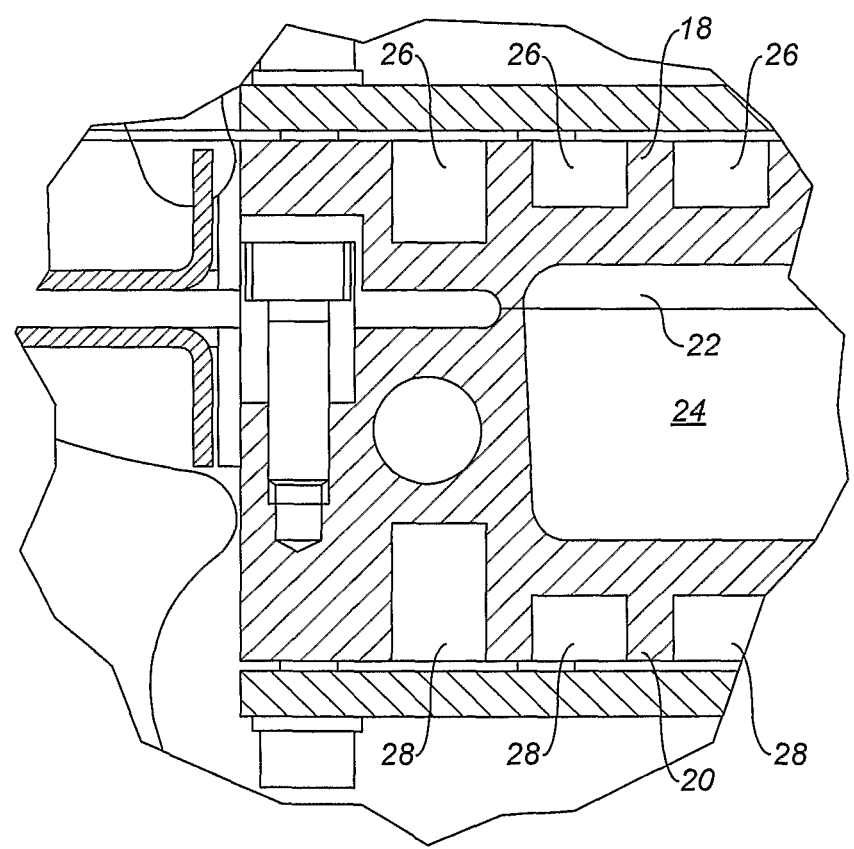
FIG. 5 is a detail view of the area marked B in FIG. 4.

Each mould 18, 20 is formed with a network of interconnecting channels 26, 28 as best seen in FIG. 5. In use, these channels 26, 28 are connectable to an external source of fluid (not shown) which can be selectively heated or cooled and circulated through the channels 26, 28 to heat or cool the moulds 18, 20 by conduction.

Preferably, each mould 18, 20 is formed with one inlet and one outlet (not shown) with a continuous closed circuit therebetween through which fluid, typically oil, can be circulated. Nevertheless, it would be possible to have an arrangement with a number of channels each having their own dedicated inlet and outlet. The external source of fluid monitors and regulates the fluid temperature as required and provides a pump to circulate the fluid. Such devices for supplying heated or cooled oil are well-known and therefore will not be described in further detail here.

Each mould 18, 20 is seated within an insulating jacket 30, 32. The moulds 18, 20 are formed of thermally conducted material such as aluminium or steel. The insulating jackets 30, 32 are typically a casing of steel enclosing an insulating material.

The insulating jackets 30, 32 are provided with a reinforcement structure of ribs 34 and interconnecting beams 36 to prevent buckling of the mould halves 12, 14 in use. The ribs 34 also act as supporting legs for the mould halves 12, 14 and provide locations for attachment of the hinges 16 and a clamping means 38 which is discussed below.

Figure 4:
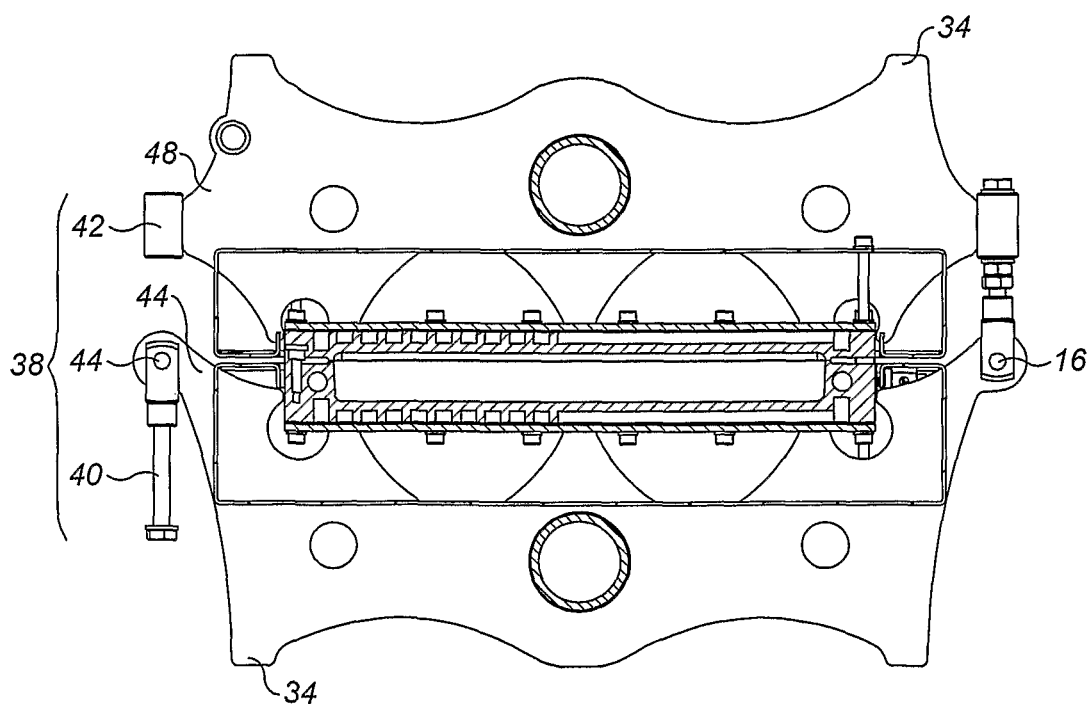
FIG. 4 is a cross-section along the line AA of FIG. 3.

Clamping means 38 is provided on the upper and lower mould halves 12, 14, on the opposite side to the location of the hinges 16, for securing the mould halves 12, 14 together when in a closed position. In this embodiment, the clamping means 38 comprises a pair of bolts 40 and a corresponding pair of collars 42. Each bolt 40 is connected at one end to a projection 44 of the reinforcing ribs 34 on the lower mould half 14, by a pivot 44. Each collar 42 is secured to a projection 48 of the reinforcing rib 34 on the upper mould half 12 and has an axially extending slot 50. In the closed position, bolts 40 initially hang downwards as seen in FIGS. 2 and 4 but can pivot clockwise and can pass through the slots 50 into the collars 42 and can then be tightened, thereby clamping the upper and lower mould halves 12, 14 together.

The process for moulding plastic articles according to the present invention and using the machine 10 will now be described, with reference to FIGS. 6a-f which illustrate the parts of the moulds 18,20 defining the mould cavities 22, 24, with other parts being omitted for clarity.

Initially, the upper and lower mould halves are in the open position shown in FIG. 1. The moulds 18, 20 are heated by circulation of heated oil through the channels 26, 28 to a temperature higher than the melting point of the plastic material which is to be used to form the skin of the product. For example, for a plastic skin of polyethylene (PE) which has a melting point of about 190° C., the moulds 18, 20 are heated up to 220° C.

Figure 6A:
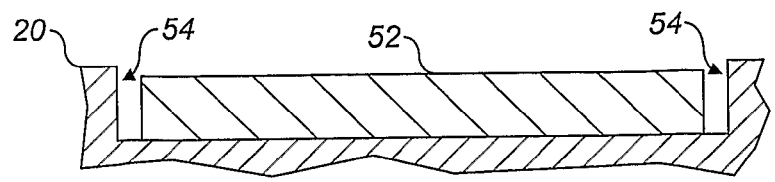
Figure 6B:
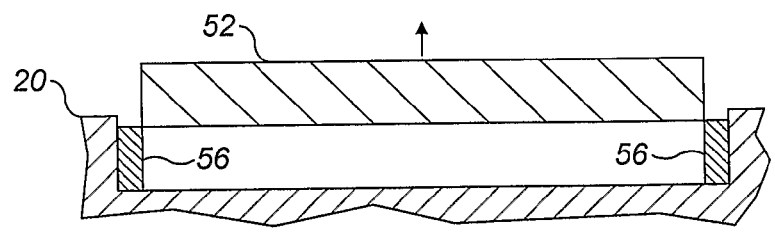

A former 52, for example made of wood, is placed into the lower mould cavity 24 as shown in FIG. 6a. The former 52 is slightly smaller than the mould cavity 24 and is positioned approximately centrally, thus leaving a gap 54 between the former 52 and the side walls of the cavity 24. Plastic material in powdered or granulated form is poured into this gap. The plastic material melts upon contact with the heated mould 24 and forms a plastic wall 56 around the sides of the mould cavity 24.

For some applications, particularly if the mould cavity 24 is deeper than the example mentioned above, e.g. 50 mm or more, it may be desirable to attach the entire machine 10 to a rotational arm. This allows the moulds 18, 20 to be inverted so that any excess plastic material can fall out. Such rotational arms are known for other types of plastic moulding processes and therefore will not be described further. If the rotational arm is used, after removal of any excess plastic material, the moulds 18, 20 are rotated back to the starting position before continuing the process and removing the former 52.

Figure 6C:
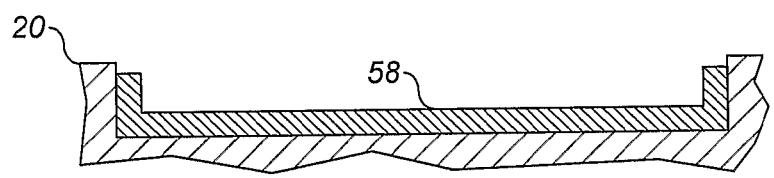

The former 52 is preferably formed of a material with a low thermal conductivity, such as wood, so that the plastic material tends not to adhere to it, allowing the former 52 to be easily removed. More powdered or granulated plastic material is poured into the open mould cavity 24 to cover the base of the cavity. Once again this melts upon contact with the heated mould 20 and joins with the plastic sidewall 56 to form a continuous plastic skin 58 lining the mould cavity 24 as shown in FIG. 6c.

Figure 6D:
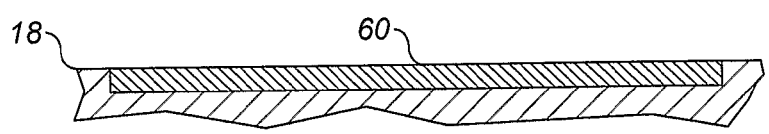

In the case of the upper mould 18, since the mould cavity 22 is much more shallow, no former is needed to create sidewalls of the plastic material. Instead, the same powdered or granulated plastic material is poured into the mould cavity 22 forming a plastic skin 60 lining the cavity in one step as shown in FIG. 6d.

A foamable filler material 62 is then placed into the cavity of the plastic skin 58 which has been formed in the lower mould cavity 24. This may be any type of heat-activated foamable product such as PE foam, but is preferably processed waste material mixed with a foaming agent. Virtually any kind of waste which would otherwise be destined for landfill can be used, including plastic, wood and metal.

Figure 6E:
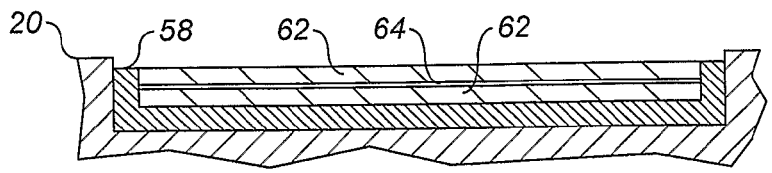
Figure 6F:
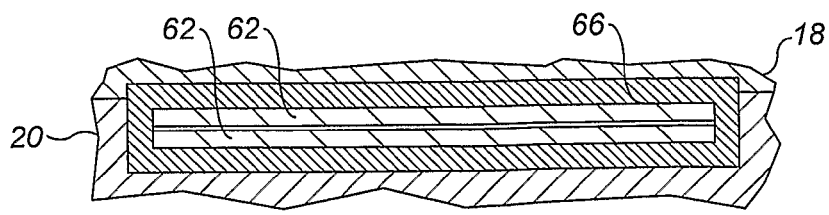

If desired, the filler material 62 may be layered up with one or more layers of other materials 64 to give special properties to the finished product, as shown in FIG. 6e. For example, layers of Kevlar (RTM) can be added for impact strength or carbon fibre for enhanced stiffness.

It is also possible to lay piping, for receiving electrics or fluid, into the plastic skin 58, so that it becomes incorporated into the finished article, surrounded by the other filler material 62. To access such piping in the finished article, mould-in inserts such as threads, or location pins could be placed in the moulds, or alternatively drilled through afterwards. Post-mould inserts are also available, where the insert thread melts into the plastic skin as it is drilled in due to friction. Thus, such piping can be accessed in the finished article without compromising the structural integrity of the finished article or the total encasement of the filler material by the plastic skin.

Once the desired filler material 62, 64 has been added, the upper mould 18 is rotated about the hinges 16 into the closed position on top of the lower mould 20 and the clamping means 38 is operated to secure the mould halves together. The plastic skin 60 formed in the upper mould cavity 22 seamlessly bonds to the plastic skin 58 formed in the lower mould cavity 24 to provide a continuous plastic shell 66 which completely encases the filler material 62,64 within it.

Since the moulds 18, 20 are clamped shut, pressure is exerted on the exterior plastic skin 58, 60 while the expanding filler material 62 simultaneously exerts pressure on its interior. This ensures the plastic skins 58, 60 completely seal around the filler material 62 to form the continuous plastic shell 66.

The foaming agent in the filler material is activated by the residual heat of the moulds 18, 20 and expands to completely fill the plastic shell. Because the mould cavity is not vented, the pressure and forces created by the expanding filler material are very high, hence the need for the reinforcing structure 34, 36 to spread the loads and prevent buckling of the mould halves 12, 14.

The mould halves 12, 14 must also be of very robust construction to withstand the thermal forces created by the large temperature range they are exposed to, for example from an ambient temperature of 20° C. up to 300° C. The reinforcing structure 34, 36 also helps to resist any distortion or deformation of the mould halves 12, 14 caused by the thermal forces. Preferably, the machine is provided with a special closing mechanism (not shown) which allows the machine to open without damage, should overpressure arise during the expansion of the filler material.

Once in the closed position, the circulation of heated oil through the channels 26, 28 is stopped and instead cooled oil is circulated instead to start the process of cooling the moulds 18, 20. The foamable filler material will start to go off once the temperature drops below certain threshold, typically about 170° C. and further expansion stops. The moulds 18, 20 are cooled further, typically to 80° C. at which point the mould halves 18, 20 can be opened and the finished plastic article removed.

The moulded article requires no further finishing. The smooth walls of the mould cavities 22, 24, and the even heating of the moulds 18, 20 by virtue of the conduction of heat from the oil circulating in the channels 26, 28, provide a smooth and even surface finish to the article. The tight clamping of the mould halves 12, 14 together, and lack of any vents in the mould cavity, ensure a seamless join between the upper and lower plastic skins with no flash to be removed later.

In this way, the entire process can be completed and a finished article produced in around 20 minutes.

The process can be carried out manually, particularly for moulds of the size mentioned above, but is equally suitable for mechanisation with the various operations being carried out by the use of hydraulic systems, cranes or robots etc.

The machine and manufacturing process are very energy efficient since the moulds 18, 20 are heated by direct conduction from the heated oil circulating through the channels 26, 28 and the insulating jackets 30, 32 inhibit heat loss. Devices for the circulation of oil and heating and cooling are readily available at comparatively low capital cost. All that is required to produce finished articles is the machine itself and one item of peripheral equipment in the form of the fluid supply and heating device. Both are comparatively low-cost items as compared with the known processes requiring ovens for heating of the moulds, conveyors and handling equipment for movement of the moulds etc. Both items are also comparatively mobile. Thus, the machine and the process lend themselves to inexpensive small-scale production, for example for smaller companies or for use in the third world where resources both in terms of finance and power supply may be limited. Nevertheless, since each machine is in effect in an entire manufacturing module, the machine and process are equally suitable for scaling up to large manufacturing units. In addition to low energy requirements, the process has the added environmental benefit of producing useful articles from waste material that would otherwise be destined for landfill.

It will be appreciated that various modifications and variations are possible without departing from the scope of the invention as set out in the claims. For example, the precise form and size of the moulds, the arrangement of the clamping means, the channels and the reinforcement structure could all differ from the precise examples given whilst performing the same function.

The invention claimed is:

1. A process for moulding a plastic article using a machine comprising a pair of moulds each defining a mould cavity, the moulds movable between an open position in which the mould cavities are open and a closed position in which the moulds co-operate to define a completely closed mould cavity, and means to heat and cool the moulds; the method comprising the steps of placing the moulds in the open position, heating the moulds in the open position by conduction to a temperature above the melting point of a given plastic material, placing the plastic material in particulate form into the moulds in the open position, whereupon the plastic forms a skin lining each mould in the open position, placing expandable filler material in the plastic skin formed in one mould, closing the moulds to create a completely closed mould cavity, whereupon the plastic skins in the moulds bond to each other to form a continuous plastic shell which completely encases the filler material, cooling the moulds and opening the moulds to remove the moulded article.

2. A process as claimed in claim 1, wherein the step of forming a plastic skin in one of the moulds comprises placing a former in the mould cavity so as to leave a gap between the former and the side walls of the cavity, placing plastic material into the gap to form a plastic skin lining the side walls of the cavity, removing the former and placing further plastic material on the bottom of the mould cavity to form a plastic skin lining the bottom of the mould and integral with the plastic skin lining the side walls.

3. A process as claimed in claim 2, wherein, prior to removal to removal of the former, the process further comprises the step of inverting the mould to remove any excess plastic material.

4. A process as claimed in claim 1, wherein the step of heating comprises pumping heated fluid through channels formed in the moulds.

5. A process as claimed in claim 1, wherein the step of cooling comprises pumping cooling fluid through channels formed in the moulds.

6. A process as claimed in claim 1, wherein the step of closing the moulds includes clamping the moulds together.

7. A process as claimed in claim 1, wherein the step of heating includes raising the temperature of the moulds to 220° C.

8. A process as claimed in claim 1, wherein the step of cooling includes lowering the temperature of the moulds to 80° C.

9. A process as claimed in claim 1, wherein the moulds are connected to each other by at least one hinge about which the moulds are pivotable to move between the open and closed positions.

10. A process as claimed in claim 1, further comprising providing an insulating jacket around each mould.

11. A process as claimed in claim 6, wherein the clamping step comprises providing at least one bolt pivotally connected to one mould and locatable in a boss secured to the other mould.

12. A process as claimed in claim 1, further comprising providing a reinforcement structure to resist buckling of the moulds and to act as a support for the moulds.

* * * * *